United States Patent Office 3,042,793
Patented July 3, 1962

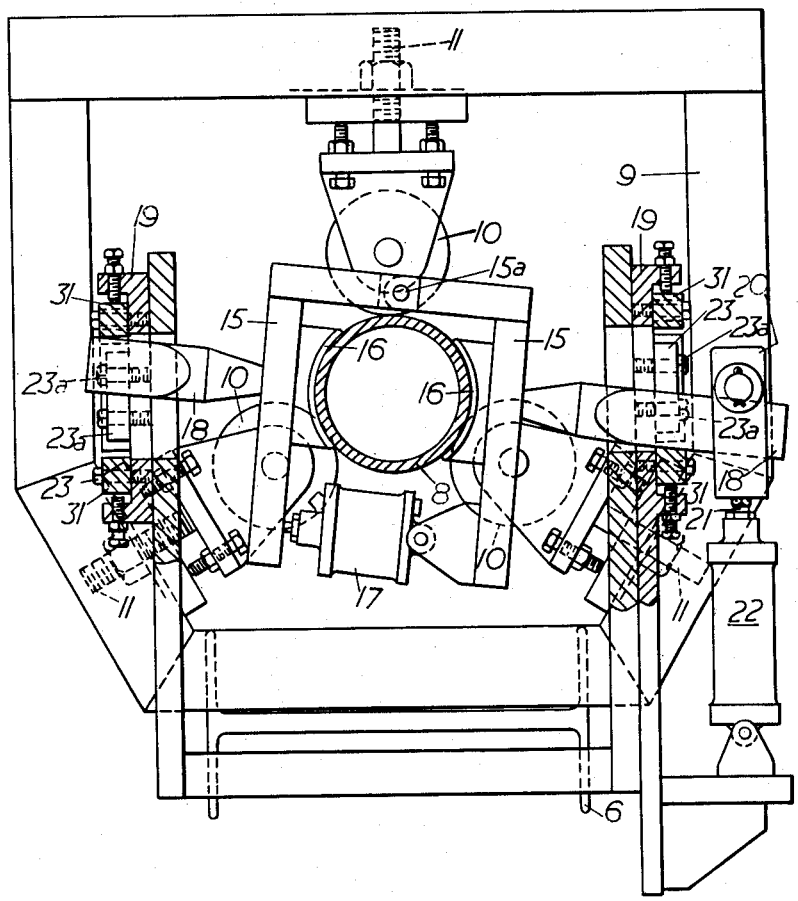

3,042,793
APPARATUS FOR PERFORMING REPETITIVE OPERATIONS AUTOMATICALLY UPON THE PERIPHERY OF A CYLINDRICAL TUBE OR THE LIKE
Richard G. Lewis, Upper Swell, Stow-on-the-Wold, England, assignor to Birwelco Limited, Birmingham, England, a British company
Filed Sept. 7, 1960, Ser. No. 54,441
2 Claims. (Cl. 219—103)

The object of this invention is to provide in a convenient form apparatus for performing repetitive operations automatically upon the periphery of a cylindrical tube or similar work piece at angularly and linearly spaced positions.

Apparatus according to the invention comprises in combination means for supporting the tube for angular and linear movement, gripping means adapted to grip the work piece intermittently, feeding means for imparting angular and linear movement to the gripping means, clamping means adapted to hold the work piece when released by the gripping means and during the performance of an operation thereon and means for controlling the sequence of operations of the gripping means, feeding means and clamping means and for initiating the performance of each operation of a machine upon the work piece.

Figure 1:
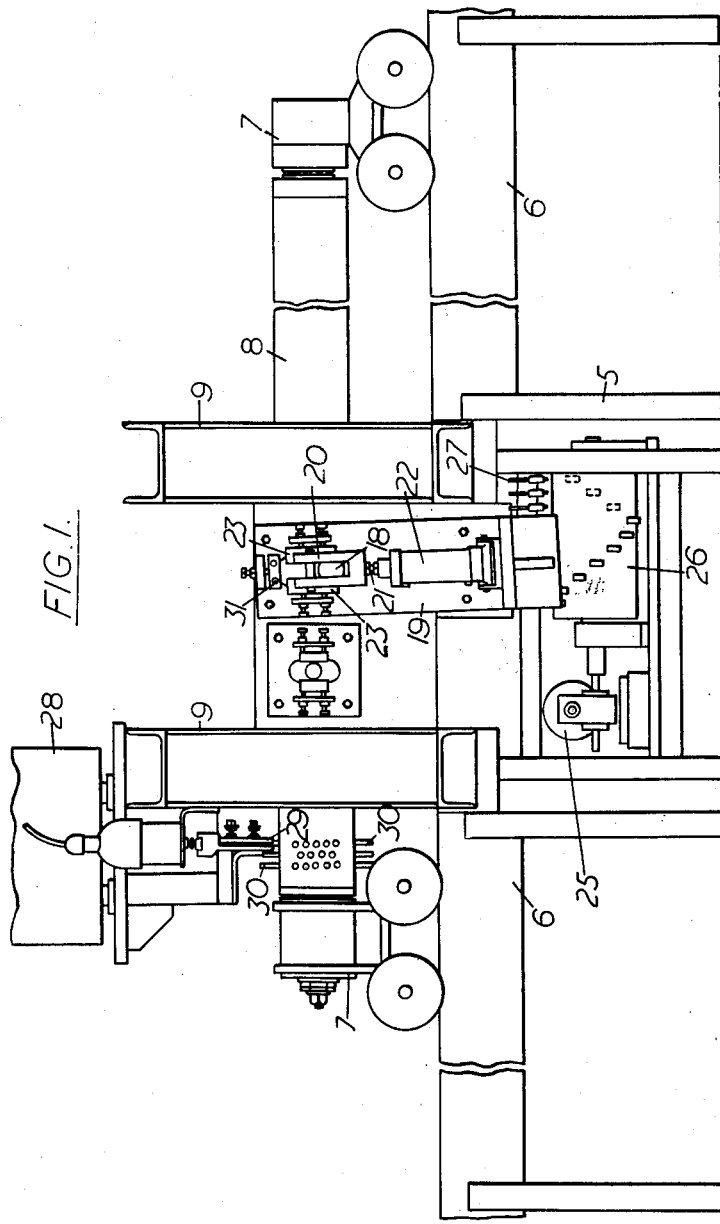
Figure 2:
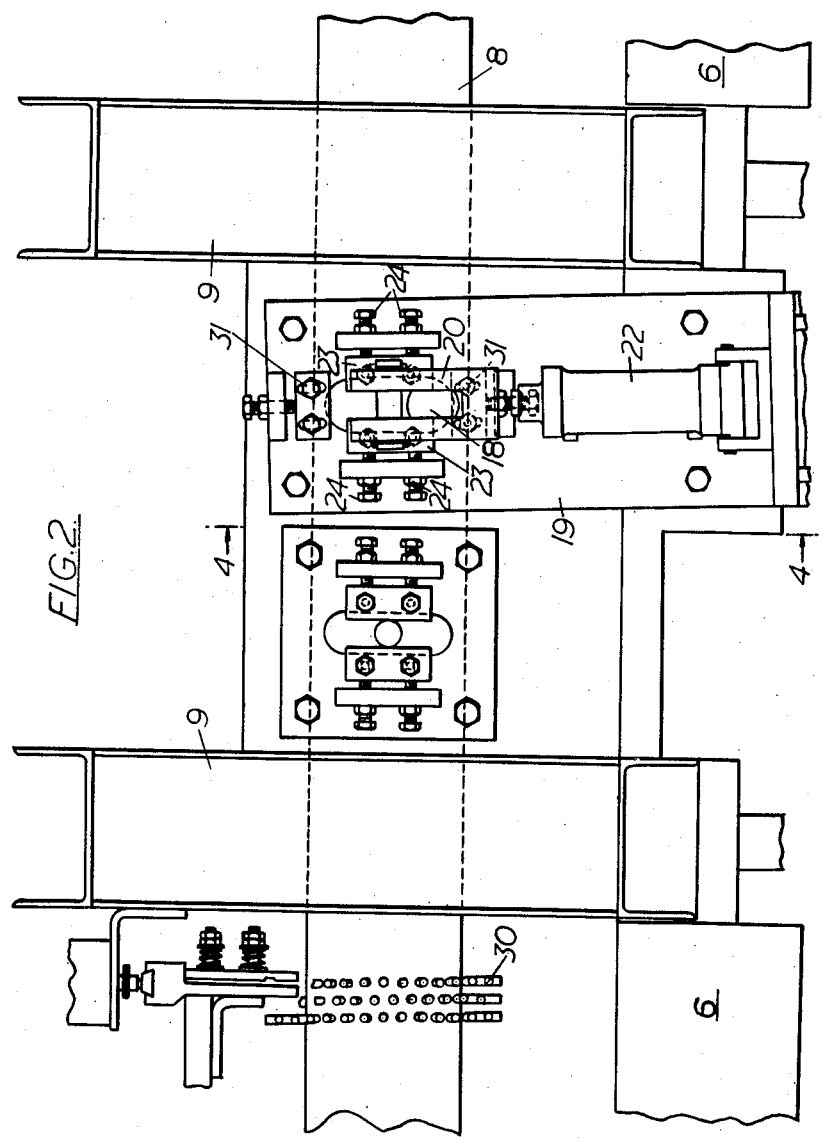
Figure 3:
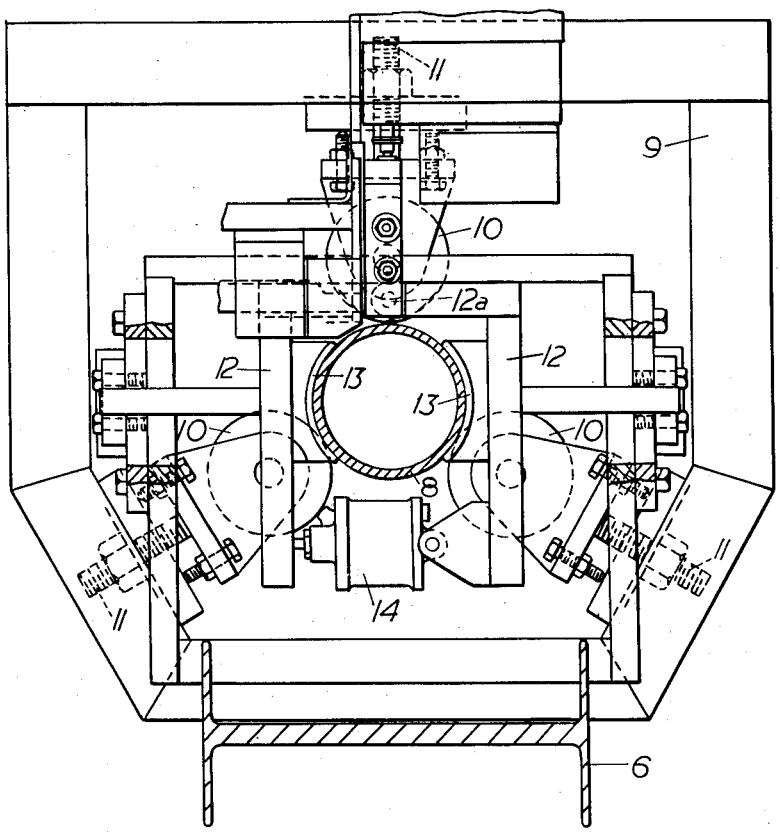

Such apparatus may be used for welding studs to the periphery of a tube in a helically extending row, so as to increase the surface area of the tube for subsequent use in a heat exchanger, and an example of apparatus for this purpose will now be described with reference to the accompanying drawings in which:

FIGURE 1 is a general side elevation of the apparatus;
FIGURE 2 is an enlarged view of the middle part of FIGURE 1;
FIGURE 3 is an end view of FIGURE 2 as seen from the left hand end of this FIGURE; and
FIGURE 4 is a section on the line 4—4 of FIGURE 2.

At the middle of the apparatus is a body part 5 from opposite ends of which extend a pair of tracks 6. On the pair of tracks respectively are a pair of trolleys 7 for supporting opposite ends of the tube 8 upon which work is to be performed, each trolley incorporating any convenient means by which the tube can be supported so as to be freely movable about its axis. Also at opposite ends of the body part 5 are a pair of frames 9, each incorporating three or more rollers 10 adapted to bear at angularly spaced positions on the periphery of the tube 8. The rollers 10 are desirably movable by screw means 11 in a direction radially relative to the axis of the tube so as to admit of their adjustment to suit tubes of various diameters.

Within the body part is a clamping means comprising a pair of pivotally interconnected levers 12 of substantially L-shape pivotally interconnected at 12a and carrying a pair of arcuate brake shoes 13 respectively which are adapted to engage opposite sides of the tube. Between the ends of the levers remote from their pivotal interconnection is arranged a double-acting pneumatic cylinder 14 whereby clamping or releasing pressure may be applied to the shoes 13. Moreover, any convenient means is provided whereby the clamping means as a whole is prevented from angular movement, so that when the shoes are engaged with the tube the latter is held firmly against both axial and angular movement.

Also within the body part is a gripping means comprising a pair of pivotally interconnected levers 15 of substantially L-shape carrying a pair of arcuate brake shoes 16 adapted to be engaged with opposite sides of the tube. Moreover, between the ends of these levers remote from their pivotal interconnection at 15a is arranged a double-acting pneumatic cylinder 17 whereby clamping or releasing pressure can be applied to the shoes. The levers 15 however, are capable of angular movement as a whole about the axis of the tube 8 as well as relative to one another. Each lever 15 has a rigid arm 18 extending with freedom through a slot formed in a pair of plates 19 secured to opposite sides of the body part of the apparatus. Furthermore, around one of the arms 18, at the right hand as seen in FIGURE 4, is disposed a stirrup 20 connected to the piston rod 21 of a double-acting pneumatic feed cylinder 22 pivotally connected to the associated plate 19 and whereby oscillatory movement can be imparted to the gripping means 15, 16 about the axis of the tube.

Clamped by means of bolts to each of the plates 19 respectively is a pair of guide strips 23, the adjacent edges of which overlap the slot in the plate and serve to guide the associated arm 18 as it is moved by the feed cylinder 22. The strips 23 are clamped by means of bolts 23a passing through slots in the strips whereby after slackening the bolts 23a the strips 23 can be angularly adjusted by means of the bolts 24. In use the strips are set at a predetermined angle to the vertical as seen in FIGURE 2 so that, as the gripping means is oscillated, movement is also imparted to it in an axial direction relative to the tube.

Driven from any convenient source, such as a constant speed electric motor 25, is a cam 26 for actuating valves 27 for controlling the admission of air to the double-acting cylinders 14, 17 and 22. The arrangement is such that after air pressure has been admitted to the cylinder 17 of the gripping means to cause the shoes 16 to engage the tube, air is admitted to the cylinder 22 to turn the gripping means together with the tube about the axis of the latter. Due to the engagement of the arms 18 with the inclined guide strips 23 this movement will also impart an axial movement to the tube. At the completion of this movement air is admitted to the cylinder 14 of the clamping means in a direction to cause the shoes 13 to grip the tube firmly. Air is then admitted to the opposite ends of the cylinders 17 and 22 with the result that the gripping means is returned to its initial position ready for the next cycle of operations, after the clamping means has been released.

Whilst the tube is held by the clamping means, the cam also actuates means, such as a switch (not shown) for initiating operation of a welding machine forming part of the apparatus. This welding machine may follow conventional practice, and incorporates a vibratory feed bowl 28 for feeding studs singly to a magazine 29 from whence one stud is fed and arc-welded to the periphery of the tube at each operation.

It will be understood that since the tube is moved angularly and axially prior to each operation of the welding machine, the studs 30 will be welded to the periphery of the tube in a helically extending row. Moreover, by adjusting the setting of the guide strips 23 the helix angle can be predetermined, whilst by adjusting the stroke of the cylinder 22, or by limiting the stroke of this cylinder by means of adjustable stops 31 at the ends of the slots in the plates 19 the spacing between adjacent studs 30 can be predetermined.

In a modification of the invention where it is required to provide a plurality of spaced and circumferentially extending rows of studs on the periphery of the tube, the feeding means may be arranged to impart angular movement only to the gripping means until a revolution of the tube is completed, at which stage axial movement is imparted to the gripping means by, for example, a reciprocating device prior to its next angular movement.

Although the invention has been described in its application to apparatus for welding studs to the periphery of a tube, it can also be applied to apparatus for performing any other repetitive operation on the periphery of a cylindrical tube or other work piece. For example, the apparatus may be used for drilling holes or recesses in the periphery of a work piece at predetermined angularly and linearly spaced positions, in which case the welding machine would be replaced by a drilling machine controlled from the cam 26.

What I claim then is:

1. In apparatus for performing repetitive operations automatically upon the periphery of a cylindrical work piece at angularly and linearly spaced positions, the provision of means for supporting the work piece for turning movement on its axis and linear movement in an axial direction, gripping means for gripping the work piece intermittently, feeding means for imparting turning movement of the gripping means about the axis of the work piece, said gripping means comprising a pair of pivotally coupled levers and brake shoes mounted thereon for gripping the work piece, fluid actuatable means interconnecting the levers to move the brake shoes into and out of gripping engagement with the work piece, an arm on each lever and a fixed guide surface in slidable engagement with the arm to effect linear movement of the gripping means in the direction of the axis of the work piece during turning movement of the gripping means, and a fluid actuatable piston in operative connection with the gripping means to impart the turning movement thereto, clamping means for holding the work piece when it is released by the gripping means and during the performing of an operation on the work piece and means for controlling the sequence of the operations of the gripping means, feeding means and clamping means and for initiating the performance of the each operation on the work piece.

2. Apparatus as claimed in claim 1, in which the clamping means also comprises a pair of pivotally coupled levers with brake shoes mounted thereon for gripping the work piece and fluid actuatable interconnecting the levers to move the brake shoes into and out of gripping engagement with the work piece.

References Cited in the file of this patent

UNITED STATES PATENTS

| | | |
|---|---|---|
| 2,389,556 | Siegerist | Nov. 20, 1945 |
| 2,392,774 | Schultze | Jan. 8, 1946 |
| 2,429,201 | Connor et al. | Oct. 21, 1947 |
| 2,437,317 | Davis | Mar. 9, 1948 |

FOREIGN PATENTS

| | | |
|---|---|---|
| 810,876 | Great Britain | Mar. 25, 1959 |